United States Patent [19]

Jury

[11] 4,425,510

[45] Jan. 10, 1984

[54] METHOD AND APPARATUS FOR TIDAL GENERATION OF POWER

[76] Inventor: Webster W. Jury, 221 Pines Lake Dr. E., Wayne, N.J. 07470

[21] Appl. No.: 383,496

[22] Filed: Jun. 1, 1982

[51] Int. Cl.³ ............................................. F03B 13/12
[52] U.S. Cl. ....................................... 290/42; 290/53; 60/505; 427/333
[58] Field of Search ...................... 290/42, 53; 60/497, 60/501, 505; 417/330, 331, 333

[56] References Cited

U.S. PATENT DOCUMENTS

| | | |
|---|---|---|
| 2,871,790 | 2/1959 | Weills .................................. 290/42 |
| 3,487,228 | 12/1969 | Kriegel . |
| 3,515,889 | 6/1970 | Kammerer . |
| 3,567,953 | 3/1971 | Lord . |
| 4,208,878 | 6/1970 | Rainey . |
| 4,258,269 | 3/1981 | Tsubota . |

FOREIGN PATENT DOCUMENTS 2365197 10/1975 Fed. Rep. of Germany .

*Primary Examiner*—J. V. Truhe
*Assistant Examiner*—Shelley Wade
*Attorney, Agent, or Firm*—Martha G. Pugh

[57] ABSTRACT

A system is disclosed for generating electric power in response to the rise and fall of tidal water. The system comprises a movable container which is mounted on a float to move up with the tide with reference to a coaxially enclosed fixed plunger, which comprises and forces a body of liquid in the movable container to overflow into a first trough adjacent its upper end. The movable container is rigidly coupled to a movable plunger which depends coaxially into a fixed container, the plunger moving down with the tide to compress a body of liquid in the fixed container, causing it to overflow into a second trough adjacent its upper end. The two troughs are interconnected vertically through a gravity flow system, including a turbine which is constantly operated by the liquid falling from one or the other of the troughs, as the tide rises and falls. One embodiment comprises two fixed containers with movable plungers and two movable containers with fixed plungers. In another embodiment, a fixed container coaxially encloses a fixed plunger, between which is coaxially disposed a third body which serves in the dual capacity of a movable plunger to the fixed container, and a movable container to the fixed plunger.

7 Claims, 8 Drawing Figures

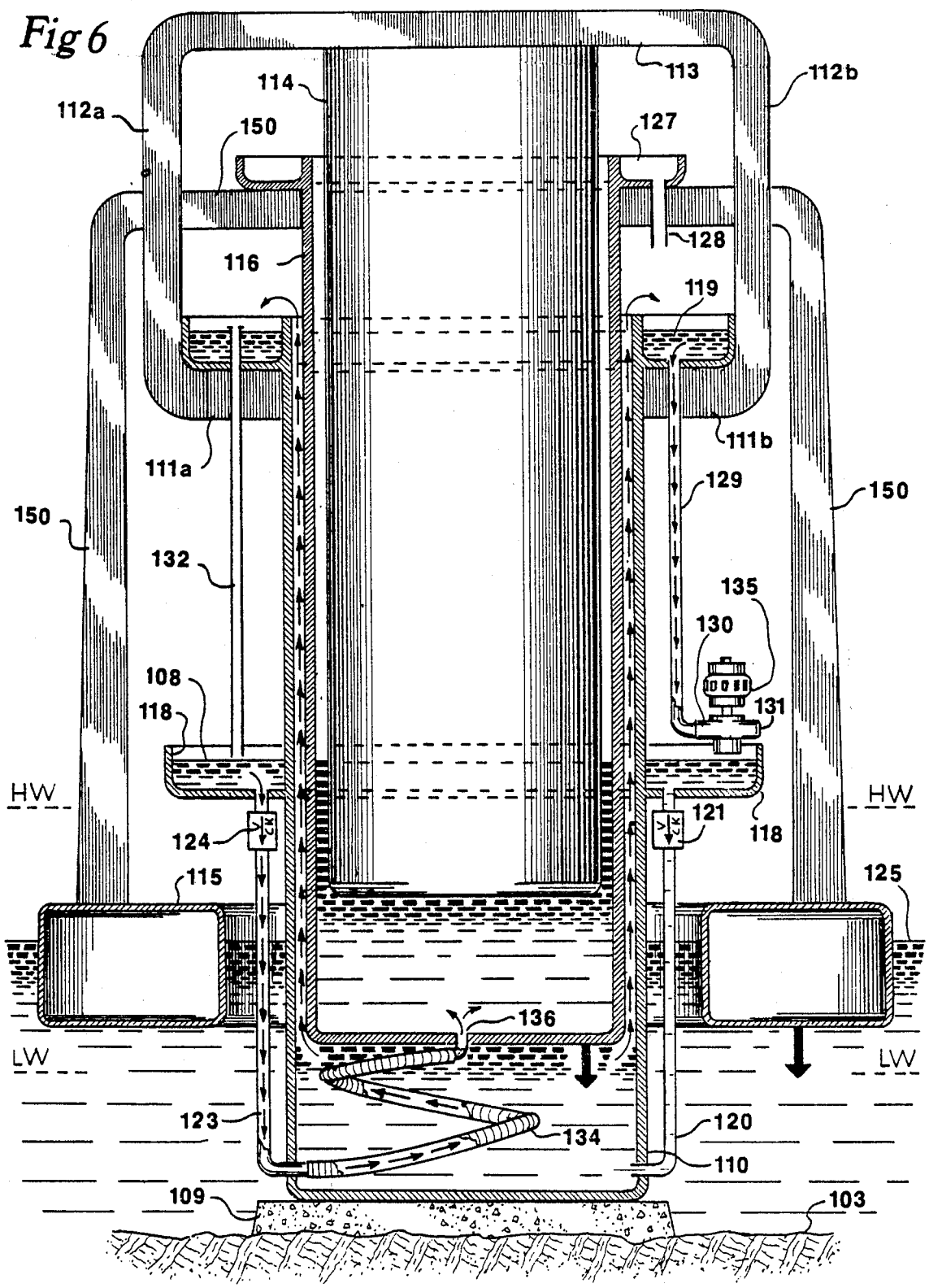

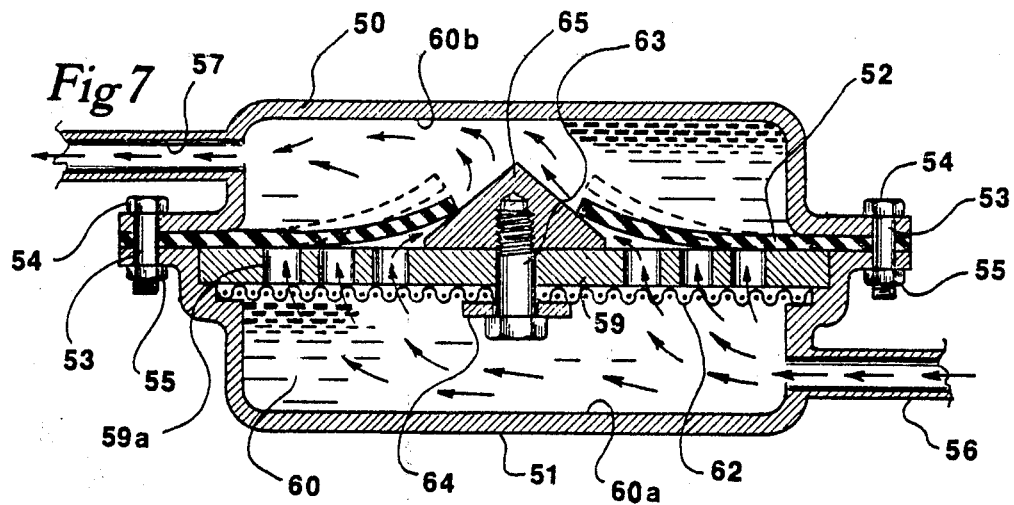
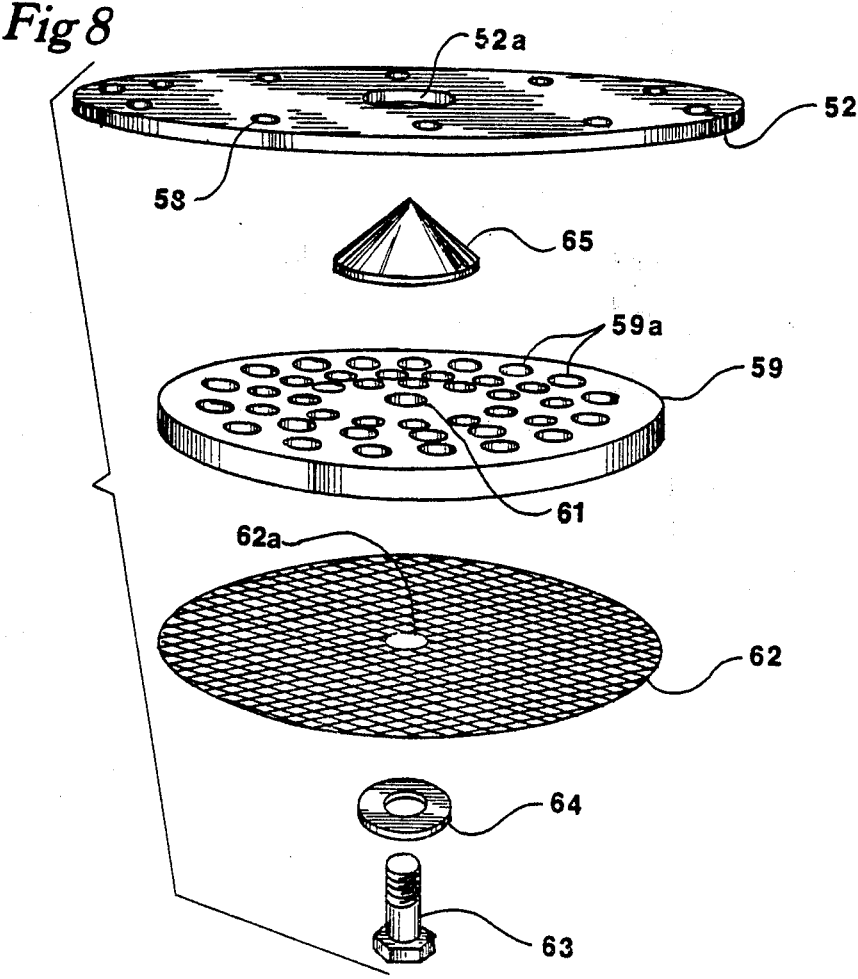

METHOD AND APPARATUS FOR TIDAL GENERATION OF POWER

BACKGROUND OF THE INVENTION

This invention relates to a method and system for using the tide to generate power.

Numerous tide-operated systems have been developed in the prior art. These have proved to be impractical and uneconomical to operate. For example, each of the systems disclosed in U.S. Pat. No. 3,487,228 to Kriegel, Dec. 30, 1969; U.S. Pat. No. 3,515,889 to Kammerer, June 2, 1970; U.S. Pat. No. 4,208,878 to Rainey, June 24, 1980; and Patent No. P23 65 197.0 of the Federal Republic of Germany, published Oct. 7, 1975 includes a conventional type pump which introduces a substantial element of friction into the system. Moreover, the system disclosed in U.S. Pat. No. 3,567,953, issued to Lord, Mar. 2, 1971 comprises a complex system of gears which also introduces a substantial amount of friction into the system. Another prior art system, such as that disclosed by Tsubota in U.S. Pat. No. 4,258,269, issued Mar. 24, 1981, relies for operation of a turbine water transfer and siphon action in a series of small diameter conduits responsive to differential in the water level in adjacent chambers. This also introduces friction and surface tension into the system, and substantially limits the volume of liquid which can be used to drive the system.

It is therefore the object of the present invention to provide an improved method and system for using the rise and fall of the tides to generate power, more particularly, in an arrangement substantially free of friction and surface tension which contemplates the raising large volumes of liquid, to provide a head enabling continuous operation by gravity flow.

These and other objects are realized in a system comprising of a plurality of sets of containers and plungers, disposed in coaxial arrangement to move in telescoping relation with the rise and fall of the tide.

The invention contemplates at least two vertically-disposed hollow containers, open at the top, each enclosing a plunger in coaxial relation. One container, and the plunger in the other container, are movable, being connected together to move up and down with the tide; whereas the other container and the plunger in one container are fixed. Each container is partially filled with liquid which moves through a closed internal circuit. When the tide rises, the movable container moves up, causing a check valve to close, and compressing enclosed liquid against the fixed plunger, thereby forcing the liquid to move up in the annular space between the fixed plunger and the movable container, overflowing into a first annular trough surrounding its upper end. When the tide falls, the movable plunger moves down in the fixed container, causing a check valve to close, and compressing the enclosed liquid against the fixed container bottom, thereby forcing the liquid to move up in the annular space between the movable plunger and the fixed container, overflowing into a second annular trough surrounding its upper end. The two annular troughs are interconnected by gravity flow through an internal liquid circuit, which incorporates a turbine through which the liquid from one or the other of the annular troughs is constantly forced to flow by the rise and fall of the tide. Liquid pressure forces open each of the check valves at the appropriate time to permit the liquid to return to a respective container. One disclosed embodiment comprises four containers in a symmetrical cruciform array. In another embodiment, a fixed outer container is arranged in coaxial relation to a fixed internal plunger, with an intermediate coaxial structure interposed between the two to serve in the dual capacity of a plunger for the outer fixed container, and a container for the inner fixed plunger.

Also enclosed as a component which greatly enhances the operation of any of the disclosed systems of the present invention is a positive action check valve which is designed to function in response to low pressure differentials. This includes a housing having intake and exhaust conduits leading to and from an inner chamber of substantially circular cross-section which is separated into intake and exhaust sections by a rigid diametrical partition. This includes a central bolt hole surrounded by a plurality of smaller openings symmetrically spaced-apart. A screen is disposed flush against the partition face on the intake side, and a flexible annular diaphragm is held against the face of the partition directed toward the output conduit so that in closed position the diaphragm acts as a flap valve. A bolt is fastened from the center of the screen through the center hold of the partition, and terminates in a conical plug with its apex directed from the face of the partition facing the exhaust conduit. The inner periphery of the annular diaphragm rests on the conical wall of the plug, from which it is displaced to open outwardly or inwardly in response to a small pressure differential between the input and exhaust conduits.

One advantage of the present system is that the turbine is continuously operated with both the rise and fall of the tide.

A further advantage of the present invention over prior art is its simplicity, and the absence of mechanical parts, such as pumps, requiring maintenance.

A further advantage of the present invention is that it contemplates the lifting of a large volume of liquid in an arrangement substantially free from friction or surface tension, to provide a substantial "head" which operates through gravity flow to generate power.

Another advantage is that a closed circuit system permits driving the turbine with any desired liquid other than sea water which can be very corrosive and abrasive.

These and other objects, features, and advantages, will be apparent from a detailed study of the description hereinafter with reference to the appended drawings.

SHORT DESCRIPTION OF THE DRAWINGS

FIG. 6 is a schematic showing of the system of FIG. 5 showing the relative positions of the elements and the flow of liquid through the system when the tide is falling.

FIG. 7 shows, in cross-section, details of check valves 21, and 24 in assembled relation.

FIG. 8 shows elements of valves 21 and 24 in exploded relation.

DETAILED DESCRIPTION OF THE DRAWINGS

Figure 1:
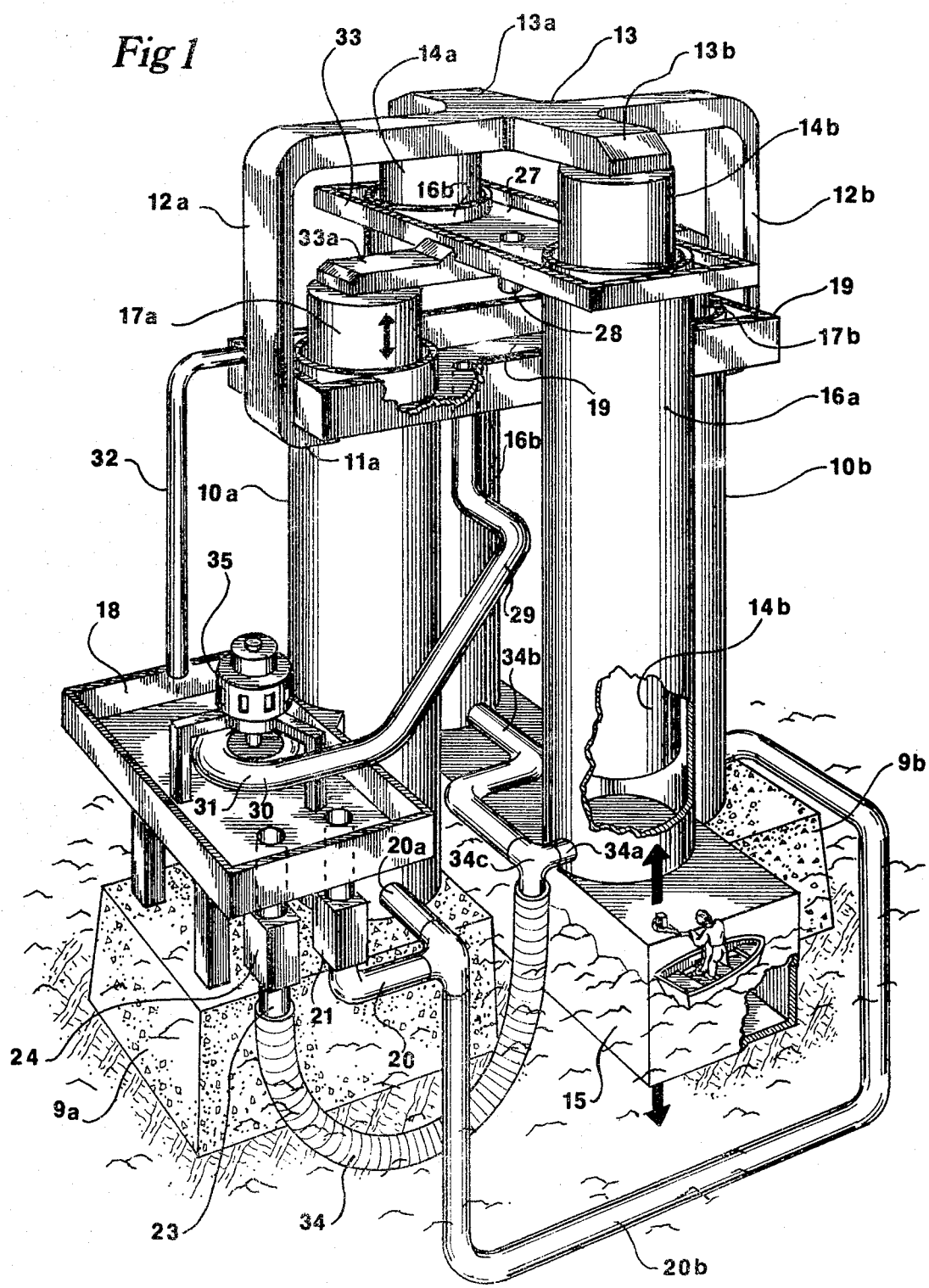
FIG. 1 is a perspective showing of an embodiment of my invention including two fixed containers and two movable containers in a cruciform arrangement. Each of the fixed containers encloses a movable plunger; and each of the movable containers encloses a fixed plunger.
Figure 2:
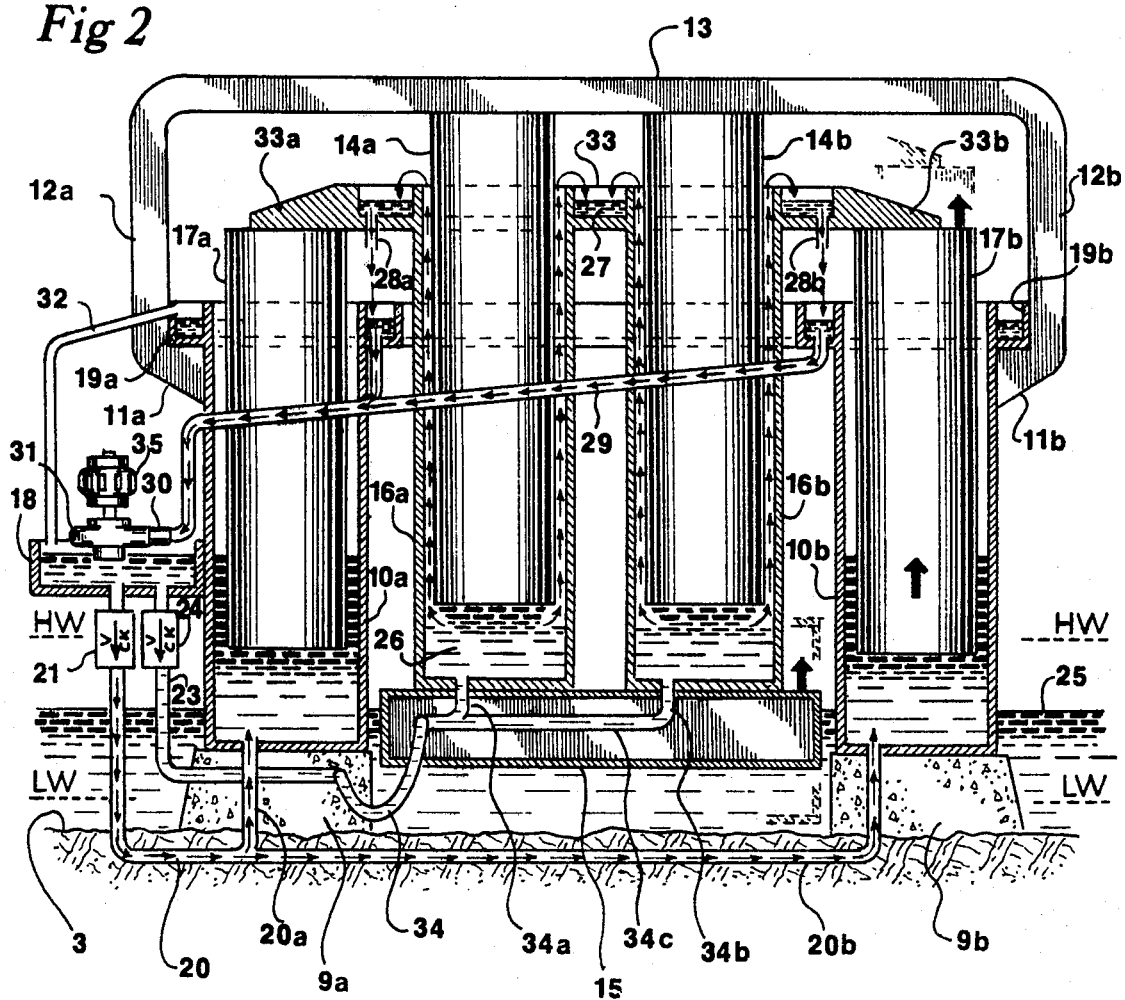
FIG. 2 is a schematic showing of a system similar to FIG. 1, which shows the relative positions of the containers and plungers and the flow of liquid through the system when the tide is rising.
Figure 3:
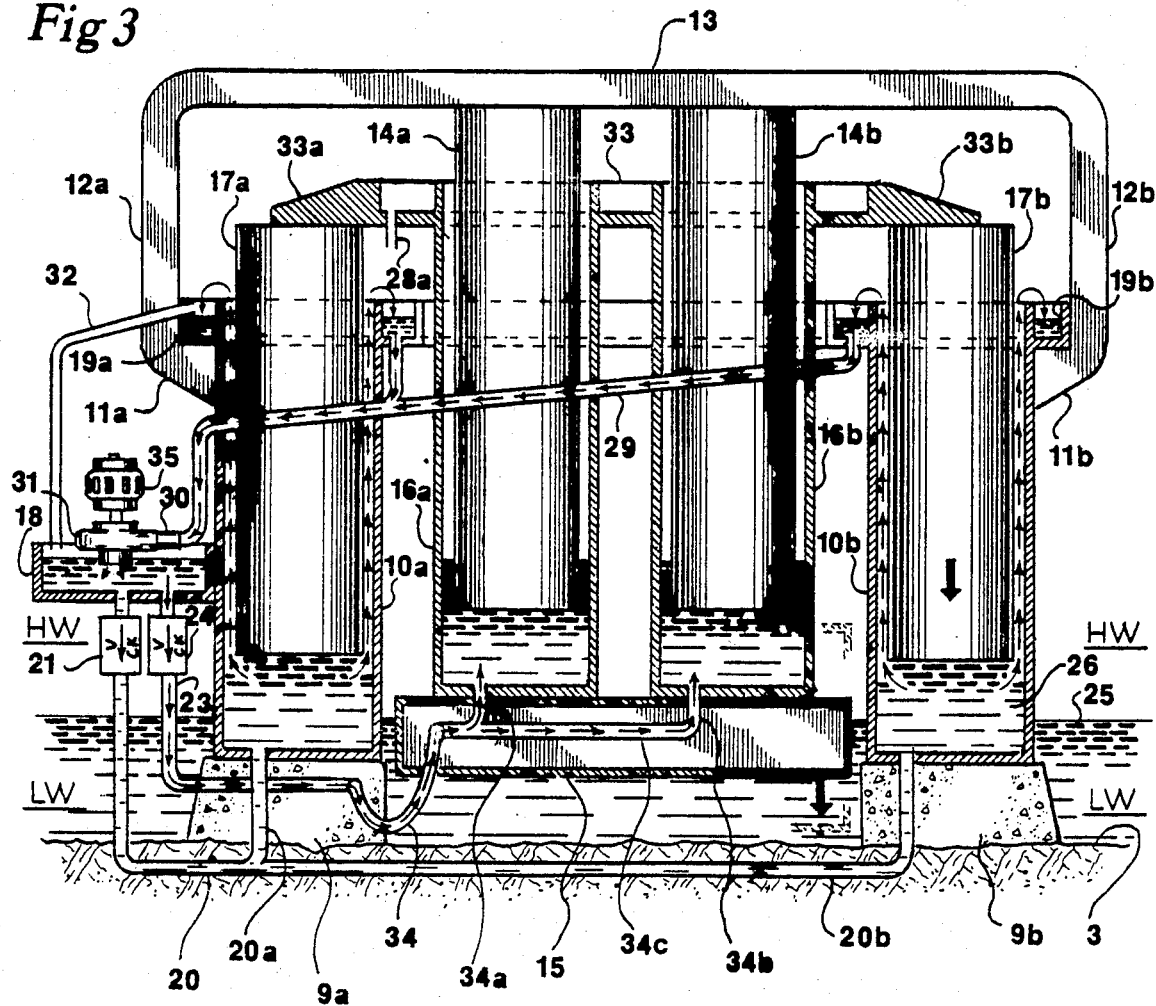
FIG. 3 is a schematic showing of FIG. 2, which shows the relative positions of the containers and plungers and the flow of liquid through the system when the tide is falling.

Structural Description of FIGS. 1–3

Referring to FIGS. 1–3, there is shown one system in accordance with the principles of the present invention, which for the sake of symmetry and balance, has been designed to include four containers, two of which, namely 10a and 10b, are anchored on supports 9a and 9b to the sea bottom, and two of which, namely 16a and 16b, are rigidly fastened to the upper surface of a float 15. The latter is a hollow body possibly of aluminum, or other metal, or plastic, such as fiberglass, of rectangular cross-section, say, 30 feet by 30 feet by 120 feet, which floats with its upper surface above the sea level. In the system under description, it is contemplated that the containers 10a, 10b and 16a, 16b are hollow cylinders, say, of heavy duty aluminum, 30 feet in diameter, and 70 feet long, closed at the bottom except for valve openings, which will be described later.

Coaxially enclosed in the containers 10a, 10b, and 16a, 16b are hollow cylindrical plungers 14a, 14b, and 17a, 17b also possibly of heavy duty aluminum, 70 feet long and 29 feet in diameter, having a wall thickness of, say, 3 inches and closed at both ends. The plungers 14a, 14b are rigidly fixed at their upper ends in downwardly-depending relation into containers 16a, 16b from arms 13a, 13b of the steel supporting strut 13. The downwardly-disposed arms 12b of the latter, are undercut to provide supports of 11a and 11b rigidly fixed to the upper ends of the fixed containers 10a, 10b, where they serve to support trough 19.

The plungers 17a, 17b which depend into fixed containers 10a, 10b, are fastened at their upper ends to cross strut 33a and 33b which are rigidly connected to 33 and which in turn is fastened to the upper ends of movable containers 16a, 16b. The strut 33 which may be of heavy duty aluminum or steel, supports the upper trough 27 fixed to and surrounding the upper ends of movable containers 16a, 16b.

Liquid flows from upper trough 27 through open end pipe 28 into lower trough 19.

A reservoir 18, which in the present embodiment, may be 50 feet long and 40 feet wide, having container walls 60 inches high, is rigidly mounted in place on support 9a, about 20 feet above the bottom of the fixed containers 10a and 10b. At the center of the reservoir 18 is mounted a turbine 31 which may be of any of the types well-known in the art. A connecting conduit 29 passes out from the lower trough 19 to the intake nozzle 30 of turbine 31.

The bottom of the reservoir 18 feeds into a liquid return circuit connected to the bottom of the fixed containers 10a and 10b, and to the bottoms of the movable containers 16a and 16b, through the respective check valves 21 and 24 which will be described in detail with reference to FIG. 7, which shows the identical assembled check valves 21 and 24 in section; and FIG. 8, which shows elements of the check valves 21 and 24 in exploded relation. The rigid pipe 20, is connected from the outlet of check valve 21 to the bottom of fixed container 10a through the pipe branch 20a, and to the bottom of fixed container 10b through fixed branch 20b.

The output pipe 23 from check valve 24 is connected to flexible pipe 34 fitted onto its mouth. Pipe 34 may be formed of any well-known resilient flexible material such as wire reinforced rubber which is liquid tight and does not readily deteriorate. It is fitted at its other end onto the manifold 34c which separates into branches 34a and 34b leading to separate containers 16a and 16b.

Structural Description of Check Valves FIGS. 7 and 8

The check valve shown in FIGS. 7 and 8, and designed for use in connection with the disclosed embodiment of my tidal operated power system is primarily for use where relatively slight pressure differential exists between the intake and outlet sides of the valve. For convenience, valve 21, FIGS. 1–3, will be described, although it will be understood that a similar description applies to valve 24 in FIGS. 1–3, and to valves 121 and 124 in FIGS. 4–6.

Referring to FIGS. 7 and 8, the valve 21 has a shallow hollow cylindrical housing formed of a pair of inverted shells 50 and 51 of bronze or other suitable metal, or of some type of rigid plastic. These provide between them an inner chamber 60 which is 36 inches in diameter and 20 inches deep, and having a wall thickness of, say, 1 inch. The two shells 50 and 51 are bolted or otherwise secured together such as by a plurality of bolts 53, having heads 54, which fit into pairs of matching holes spaced-apart around the protruding mating peripheral edges of 50 and 51, the bolts 53 being secured at their respective ends by screw-threaded nuts 55. An intake pipe 56, which may be, for example, 6 inches in inner diameter, leads into the lower end of the lower housing shell 51, whereas an exhaust pipe 57, of substantially the same inner diameter leads out from the upper portion in a position which may be, although not necessarily at the opposite end of upper housing shell 50.

Fastened diametrically across the chamber 60 so that it separates the chamber into a lower portion 60a and an upper portion 60b, is an annular disc-shaped diaphragm 52 formed, for example, of cloth-reinforced sheet rubber, 36 inches in diameter and 1¼ inches thick, and having a central opening 52a 8 inches in diameter. Diaphragm 52 has a plurality of holes 58 spaced-apart adjacent the peripheral edge, which match the holes in the mating edges of housing shells 50 and 51, and which accommodate the bolts 53, holding the edge of the diaphragm in place between the housing shells. A conical plug 65, say of brass, 12 inches at its base, and rising to 5 inches at its apex, is supported in central relation to the upper face of perforated disc 59 which is 28 inches in diameter, and 1¼ inches thick. Disc 59 is also, for example, of brass or solid plastic, which is accommodated in an annular recess of shell 51 adjacent the upper inner mating edge with shell 50. The disc 59 supports the lower face of diaphragm 52 near its outer periphery, the inner periphery resting against the conical surface of the plug 65. The perforated disc 59 has a plurality of openings 59a, say, 50, each, say 1½ inches in diameter, which are spaced-apart symmetrically in a coaxial array around a central screw-hole 61, which, in the present embodiment, is, say, 3 inches in diameter. Disposed against the lower face of the disc 59 is a screen 62, say, 6 gauge wire, such as brass, having openings, say, ⅜ inch across, and a central opening 62a. The screen 62, disc 59 and plug 65 are held rigidly in contacting relation by means of a bolt 63 which is accommodated at its upper end in a screw-hole centered in the underside of the conical plug 65, and which is tightened at its lower end against a washer 64.

Conventional check valves of the types known in the prior art depend primarily on back-up pressure on a closing flap, ball or plug, which produces a total exerted pressure equal to the difference between the pressure per square inch on the outlet side, and that on the inlet side, multiplied by the area of the opening in square inches. For example, seven pounds per square inch on the outlet side minus four pounds per square inch on the inlet side equals three pounds per square inch total pressure; then, assuming the opening to be two square inches, the pressure exerted at the opening is two times three, or six pounds. The same arithmetic would apply to computing the pressure to open the valve if the inlet pressure exceeds the outlet pressure.

The low pressure differential check valve shown in FIG. 7 incorporates the flow opening in the center of a movable diaphragm 52 which acts as a flap-valve against the immovable closing plug 65, covering and uncovering the openings 59a. Disc 59 functions only to support diaphragm 52 against back pressure, and ports in 59 are for flow only. As one can see in the drawing, the area of exertion to operate the valve can be many times greater than the area of the opening, whereby, referring back to previous arithmetic, and assuming the effective area of the diaphragm to be, perhaps, ten square inches instead of two square inches, the exerted closing pressure in the valve of FIG. 7 could be thirty pounds, instead of six pounds as in prior art type valves, with a like difference for opening pressure.

Whereas this valve was designed primarily for use with embodiments of the present invention, it is adapted for any application in which a positive action check valve is required, particularly where very little pressure differential exists.

It is contemplated that valves of the present design could be made in many sizes for use in water lines, chemical plants, laboratories, for medical purposes, etc., and for liquids or gases.

Operation of Embodiment of FIGS. 1-3

The purpose of the assemblage shown in FIGS. 1-3 is to harness both the rise and fall of ocean tides to raise water (not necessarily sea water) to a reservoir high enough above a water turbine to create sufficient "head" or water pressure to drive the turbine continuously and efficiently, and in turn drive a generator or alternator.

A further purpose of the assemblage there shown is to minimize the volume of water involved, or the amount of equipment necessary to produce a given killowattage of electricity from the tides.

Note that as illustrated in FIGS. 1, 2 and 3, containers 10a, 10b, supports 11a, 11b, posts 12a, 12b, beam 13, and plungers 14a, 14b are all solidly attached to each other and are anchored or resting immovably on the ocean floor. Components that are solidly connected by structure into a unit that moves upward and downward with the tide include: float 15, containers 16a, 16b, yoke 33 and plungers 17a, 17b. Reservoirs 18 and 19 and associated components remain stationary. Before operating the assemblage, reservoir 18 must be filled with water (or other liquid) until the water, having flowed through check valves 21 and 24 and pipes 20 and 23 has filled containers 10a, 10b and 16a, 16b.

FIG. 2 indicates by arrows the direction components move, and where water (or other liquid) 26 will flow as the tide rises. The following happens as the tide rises.

Assuming containers 10a, 10b and 16a, 16b are filled sufficiently, and the tide water 25 rises; then float 15 rises, as do containers 16a, 16b, whereby check valve 24 closes to prevent water from returning to reservoir 18. Inasmuch as plungers 14a, 14b are stationary, the water 26 being displaced by plungers 14a, 14b as containers 16a, 16b rise, is forced upward, overflowing the edges of containers 16a, 16b into trough 27, and thence through open end pipes 28a, 28b into upper reservoir 19a, 19b, passing through pipe 29 to nozzle 30, forcing rotation of the blades of turbine 31, thereby driving generator or alternator 35. Expended water then returns from the turbine 31 to reservoir 18 flowing again through pipe 20, and open check valve 21 into fixed containers 10a, 10b.

Referring to FIG. 3 as the tide falls, check valve 21 closes, and plungers 17a, 17b which are attached through yoke 33 to containers 16a, 16b, and likewise float 15, move downward. As plungers 17a, 17b move downward, they displace water in fixed containers 10a, 10b which overflows directly into upper reservoir 19, thence flowing downward through conduit 29 to keep turbine 31 operating.

Thus, water is pumped in a closed circuit by one container-plunger combination when the tide rises, and by another container-plunger combination when the tide falls.

Figure 4:
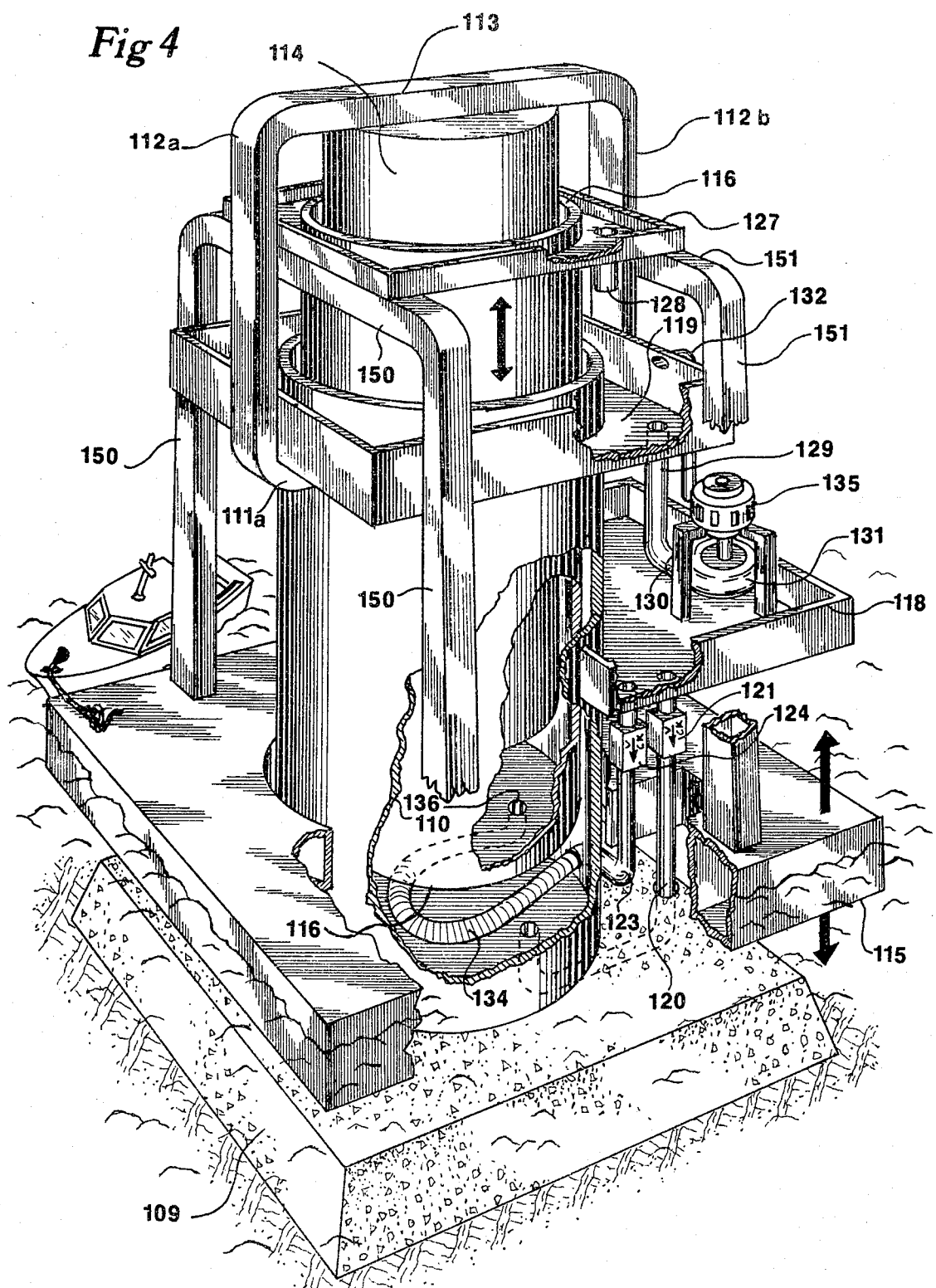
FIG. 4 is a perspective showing of a modified form of the system of the present invention comprising a fixed outer container which coaxially surrounds a fixed central plunger, a movable cylinder, which serves in the dual capacity of a plunger-container disposed to move up and down with the tide, being mounted between the fixed outer container and the fixed inner plunger.
Figure 5:
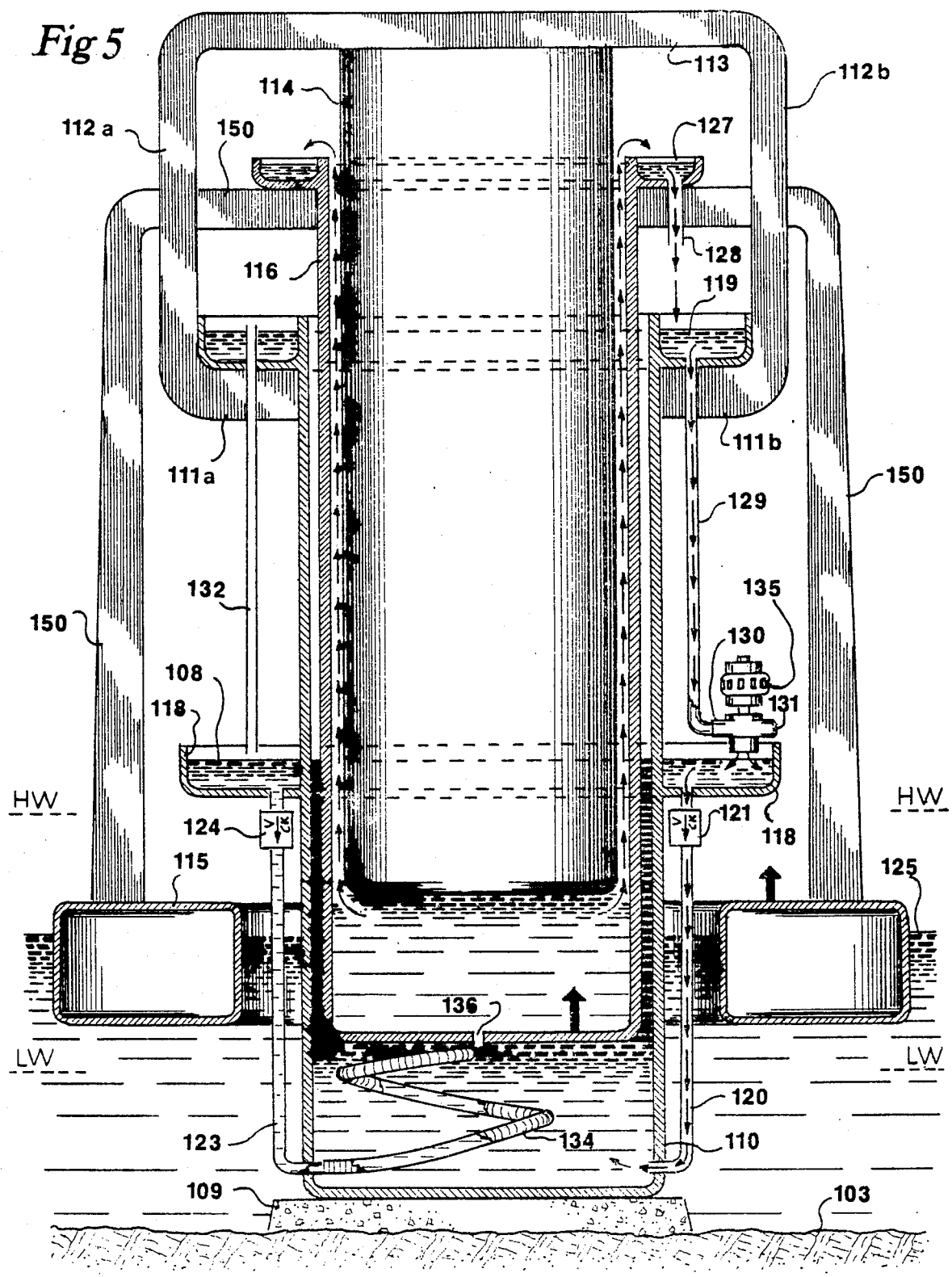
FIG. 5 is a schematic showing of a system similar to FIG. 4 indicating the relative positions of the elements and the flow of liquid through the system when the tide is rising.

Structural Description of FIGS. 4-6

Referring to FIGS. 4-6, there is shown a modified system in accordance with the present invention, wherein a fixed outer container 110, which may be, for example, a hollow cylinder of aluminum, or heavy-duty plastic, having a wall thickness of 3 inches, which is 60 feet in outer diameter, and 90 feet high, open at its upper end and closed at the bottom, except for intake and exhaust pipes.

Supported from the upper periphery of container 110 is a surrounding trough 119, which may be of the same material as cylindrical container 110. In the present embodiment trough 119 is square, 70 feet on a side, externally, with walls 60 inches high, and 1 inch thick.

Centered on one pair of sides of the rectangular trough 119 is a supporting strut of, say, hollow steel, 12 inches wide and 4 inches thick, comprising a pair of vertically-disposed lateral arms 112a and 112b, joined by a horizontal cross-bar 113. The lower ends of vertical arms 112a and 112b are bent inwardly to provide supports 111a and 111b for the trough 119.

Centered on and suspended in rigid relation from the under side of cross-bar 113, in coaxial relation to the fixed outer container 110, is a fixed plunger 114, which may also be formed, for example, of heavy-duty aluminum. This may take the form of a hollow cylinder, say 59 feet in outer diameter, and extending 60 feet vertically downward, being either solid or closed at both ends. There is a clearance of, say 12 inches between the inner wall of the outer container 110 and the outer wall of the fixed plunger 114.

Surrounding the outer container 110, so that the latter is accommodated without contact in a round opening, say 62 feet in diameter, at its center, is a hollow float 115. In the present embodiment, this may also be formed of aluminum, or heavy-duty plastic, having walls, say, 2 inches thick. For example, the hollow float 115 may be 100 feet square and 10 feet deep, in its external dimension. The float 115 serves as a support for a framework comprising a member 150 having a pair of vertical posts supporting a horizontal cross-bar across the top, matched by 151 on the other side, comprising a pair of vertical posts which also support a parallel cross-bar across the top. Supported in rigid relation on top of the cross-bars 150 and 151, substantially above the trough 119, is an upper trough 127, which in the present embodiment is square, say 70 feet on a side, and having side walls 1½ inches thick and 12 inches high. The trough 127 is rigidly fastened at its center to the upper end of a movable cylinder 116. The latter, which may also be of aluminum, or heavy-duty plastic, 59½ feet in diameter, depending vertically 90 feet in coaxial relation between fixed outer container 110 and the plunger 114. Cylinder 116, which has a wall thickness of 4 inches, is open at the upper end adjacent the trough 127, and closed at its lower end so that it serves in the dual capacity of a plunger relative to container 110, and a container relative to fixed plunger 114, as the float 115 moves up and down with the tide.

A lower reservoir 118, which in the present embodiment may be rectangular 30 feet by 20 feet, and having side walls 2 inches thick and 60 inches high, is supported in fixed relation to the base 109, adjacent to outer container 110, about 20 feet above its lower end.

As in the earlier-described embodiment, a turbine 131 is mounted so that its exhaust flows into reservoir 118.

The input nozzle 130 to turbine 131 is connected from trough 119 through pipe 129. The upper trough 127 is connected to lower trough 119 through a conduit opening 128.

The water or other liquid stored in the reservoir 118 is returned to the bottom of fixed container 110 or the movable container 116, depending on how the tide is moving. Reservoir 118 is connected to fixed container 110 through a rigid conduit 120, which may be of aluminum, 6 inches in diameter, and into which is interposed a check valve 121 which is preferably of the form described with reference to FIGS. 7 and 8 hereinbefore.

Reservoir 118 is also connected to movable container 116 through a rigid conduit 123, which may be aluminum, 6 inches in inner diameter, and which is, in turn, connected through a seal in the base of fixed container 110 to a flexible pipe 134 of wire reinforced rubber or segmented metal, which leads into the bottom of movable container 116 through opening 136. A check valve 124 interposed in pipe 123 is substantially similar to check valve 121, and is of the type described in detail with reference to FIGS. 7 and 8.

Operation of Embodiments of FIGS. 4–6

As with the system shown in FIGS. 1–3, the purpose of the modification shown in FIGS. 4–6 is to harness both the rise and fall of ocean tides to raise water (not necessarily sea water) to a reservoir high enough above a water turbine to create sufficient "head" or water pressure to drive the turbine continuously and efficiently, and in turn drive a generator or alternator. A further purpose of this assemblage is to minimize the volume of water or amount of equipment necessary to produce a given killowattage of electricity from tides.

As with the system shown with reference to FIGS. 1–3 in the previously described embodiment, this system utilizes a stationary outer container 110, a stationary plunger 114, and a second intermediate container 116 moved by the tides between the wall of the stationary container 110 and plunger 114. FIG. 4 is an overall perspective showing of a typical assemblage in accordance with this embodiment. FIG. 5 is a schematic of a similar assemblage as the tide rises; and FIG. 6 is a schematic of the assemblage as the tide falls.

In each of these figures, container 110, connecting bar 113, vertical arms 112*a* and 112*b*, supporting means 111*a* and 111*b*, trough 119, and plunger 114 are all solidly attached as a unit that rests on or is anchored immovably to the ocean floor 103.

Components that are solidly connected by structure and move upward and downward with the tide water 125 include float 115, vertical supporting frames 150 and 151, which support trough 127, and plunger-container 116.

Before operating this assemblage, the lower reservoir 118 must be filled with water until the water, having flowed through check valves 121 and 124, which respectively lead into fixed pipe 120, and into flexible pipe 134, through pipe 123 to fill containers 110 and 116 to a level 108.

Referring to FIG. 5 which indicates by arrows the direction that the components move and where water will flow, as the tide rises, assuming containers 110 and 116 are filled to water level 108, the float 115 rises; and so does container 116, whereby check valve 124 closes. Then, since plunger 114 is stationary, the water in container 116 is displaced by plunger 114, and so forced to overflow into upper reservoir 127, then flowing through outlet pipe 128 to trough 119, and from trough 119 through conduit 129 to nozzle 130 to turn turbine 131, operating generator 135.

The exhaust water from turbine 131 returns to reservoir 118, and through check valve 121 and fixed pipe 120 to fixed container 110.

Referring now to FIG. 6 which shows a falling tide, plunger-container 116 is lowered, and check valve 124 opens to allow water to flow by gravity from reservoir 118 into container-plunger 116, while check valve 121 closes. Water in container 110 is forced by container-plunger 116 to rise and overflow into trough 119, flowing through pipe 129 and nozzle 130 to rotate turbine 131. The exhaust from turbine 131 then falls into reservoir 118 where it returns to the interior of plunger-container 116 through check valve 124, conduit 123, and flexible hose 134.

Thus, water is pumped in a closed circuit whereby the reservoir 119 is kept filled sufficiently to keep a constant flow of water through the turbine 131, flowing from reservoir 118 back into fixed container 110 as the tide rises, or movable container-plunger 116 as the tide falls, reverse flow being prevented by check valves 121 and 124. Overflow pipe 132 allows excess water to flow directly from trough 119 into reservoir 118.

It should be recognized that the unit as disclosed in FIGS. 4, 5 and 6 can be constructed in alternative forms, essentially inside out, having trough 127 inside of container-plunger 116, having upper reservoir 119, inside of container 110, and having the turbine inside of plunger 114, utilizing the interior of plunger 114 as a lower reservoir. While such an arrangement would necessitate some redesign of container and plunger, heights, piping, etc., it could prove advantageous to have the turbine enclosed.

It will be understood that various modifications and arrangements of embodiments utilizing the principles of the present invention will occur to those skilled in the art, in addition to those shown by way of example. Accordingly, the invention is not to be construed as limited, except as defined by the claims hereinafter.

What I claim is:

1. A system for generating electric power in response to the rise and fall of tidal water which comprises in combination:

at least two containers, open at the top to the atmosphere, each closed at their lower ends, each of said containers enclosing a plunger in depending coaxial telescoping relation for vertical motion through an open upper end of said container wherein the inner wall of said container is spaced-apart from the outer wall of said plunger;

a float disposed to rise and fall with the tide;

one said container and the plunger in the other said container being in fixed position with reference to the rise and fall of said tide;

the other said container and the plunger in said one container being mechanically coupled to said float to move vertically with the rise and fall of said tide;

each of said containers being initially partially filled with sufficient liquid to overflow the top of said container when said plunger or said container moves in telescoping relation towards a position of maximum internal displacement by said plunger in said container;

each said container having fixed adjacent its upper end an annular trough to receive the overflow of liquid from the said container;

said troughs being interconnected by conduit means, and connected to a gravity flow system including a reservoir, whereby the liquid from said troughs is returned to each of said containers through said reservoir;

a turbine interposed into said gravity flow system and operative to generate power in response to the flow of liquid through said gravity flow system.

2. The combination in accordance with claim 1 wherein a pressure-actuated check valve is interposed into said gravity flow system between said reservoir and each said container to prevent the liquid in each said container from returning to the said reservoir when the plunger approaches a position of maximum internal displacement in said container.

3. A system in accordance with claim 1 wherein said at least two containers comprises an even number of containers, each comprising a plunger in depending coaxial telescoping relation for vertical motion through the open upper end of said container, said containers arranged in symmetrical relation with their vertical axes disposed in substantially parallel relation around a central location;

wherein alternate ones of said containers and the plungers in the other said containers are fixed with reference to the rise and fall of the tide; and wherein the other ones of said containers and the plungers in the alternate ones of said containers each bear a fixed relation to said float, being disposed to rise and fall with the tide.

4. A system in accordance with claim 1 wherein the outer one of said containers is fixed with reference to the rise and fall of the tide; and, wherein one said plunger, fixed with reference to the rise and fall of the tide, is disposed in depending axial relation through the open upper end of said fixed outer container; and wherein a second one of said containers is interposed into the open end of said fixed container in telescoping coaxial relation between the inner wall of said fixed container and the outer wall of said fixed plunger, said second container having a mechanical coupling to said float, whereby when the tide is falling said second container functions as a plunger moving towards a position of maximum displacement in said fixed container, and whereby when the tide is rising said second container moves toward a position of maximum displacement of said fixed plunger in said second container.

5. A system for generating electric power in response to the rise and fall of tidal water which comprises in combination:

at least two containers each closed at their lower ends, each of said containers enclosing a plunger in depending coaxial telescoping relation for vertical motion through an open upper end of said container;

a float disposed to rise and fall with the tide;

one said container and the plunger in the other said container being in fixed position with reference to the rise and fall of said tide;

the other said container and the plunger in said one container being mechanically coupled to said float to move vertically with the rise and fall of said tide;

each of said containers being initially partially filled with sufficient liquid to overflow the top of said container when said plunger or said container moves in telescoping relation towards a position of maximum internal displacement by said plunger in said container;

each said container having fixed adjacent its upper end a trough to receive the overflow of liquid from the said container;

said troughs being interconnected, and connected to a gravity flow system including a reservoir, whereby the liquid from said troughs is returned to each of said containers through said reservoir;

a turbine interposed into said gravity flow system and operative to generate power in response to the flow of liquid through said gravity flow system;

a pressure-actuated check valve interposed into said gravity flow system between said reservoir and each said container to prevent the liquid in each said container from returning to the said reservoir when the plunger approaches a position of maximum internal displacement in said container;

wherein at least one said pressure-actuated check valve comprises in combination:

a housing comprising a pair of hollow shells which are secured in mating relation at their edges to form a hollow chamber, an intake conduit to one portion of said chamber, and an exhaust conduit leading from another portion of said chamber spaced-apart from said intake conduit;

means for separating the portions of said chamber adjacent said intake and exhaust conduits comprising a rigid partition extending across in substantially diametric relation to said chamber and having its edges fixed in the wall of said housing, said partition having a plurality of openings through its thickness which are spaced-apart around a central opening;

a conical plug with its base centered on said partition, and its apex directed into the portion of the chamber adjacent said exhaust conduit;

a screen disposed flush against one face of said partition, facing said intake conduit;

an annular flexible diaphragm having its outer peripheral edge secured between the edges of said hollow shells, and said peripheral portion disposed flush against the outer face of said partition facing said exhaust conduit so that said flexible diaphragm acts as a flap-valve to open and close against said conical plug;

means interposed through the central opening in said partition for securing said screen and said conical plug to opposite faces of said partition;

the inner periphery of said annular flexible diaphragm resting against the conical sides of said plug, whereby fluid flowing into said intake conduit passes through said screen and the openings in said partition forcing the inner portion of said diaphragm away from the conical wall of said plug.

6. The method of generating power in response to the rise and fall of the tide which comprises the steps of:

providing at least two containers, each of said containers being open at the top to the atmosphere, each containing a body of liquid and a plunger which is disposed to move in and out of the open upper ends of the said containers telescopically so that as the plunger approaches a position of maximum displacement in each said container the liquid is spilled from the open upper end of the said container into a gravity flow system containing a turbine;

returning the outflow by gravity flow from said turbine to each said container;

connecting one said container and the plunger in the other said container in fixed relation immune to the rise and fall of the tide; and coupling the other said container and the plunger in said one container to floating means to rise and fall with the tide;

whereby during rise of the tide, the other said container rises in relation to the fixed plunger, and during the fall of the tide, the plunger in the other said container falls in relation to the fixed container, in each case causing the liquid contained in said container to spill over the top of one or the other of said containers into a gravity flow system for continuously operating said turbine.

7. The method in accordance with claim 6 wherein check valves are interposed into said gravity flow system which close in response to pressure when each of said plungers approaches a position of maximum displacement in each said container, preventing the back flowing of liquid out of the bottom of said container.

* * * * *